US006557121B1

(12) United States Patent
McLaughlin et al.

(10) Patent No.: US 6,557,121 B1
(45) Date of Patent: Apr. 29, 2003

(54) METHOD AND SYSTEM FOR FAULT ISOLATION FOR PCI BUS ERRORS

(75) Inventors: Charles Andrew McLaughlin, Round Rock, TX (US); Alongkorn Kitamorn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 08/829,088

(22) Filed: Mar. 31, 1997

(51) Int. Cl.[7] .................................................. G06F 1/00
(52) U.S. Cl. .............................. 714/44; 714/43; 714/8
(58) Field of Search ...................... 395/183.19, 183.2, 395/184.01, 182.06, 182.07, 740, 741, 742, 308, 309, 836, 839, 866, 868; 714/8, 25, 43, 44

(56) References Cited

U.S. PATENT DOCUMENTS

| | | | |
|---|---|---|---|
| 4,044,337 A | 8/1977 | Hicks et al. ................. 364/200 |
| 4,095,268 A | 6/1978 | Kobayashi et al. .......... 364/200 |
| 4,215,397 A | 7/1980 | Hom ........................... 364/101 |
| 4,360,917 A | * 11/1982 | Sindelar et al. ......... 395/182.03 |
| 4,511,982 A | 4/1985 | Kurakake .................... 364/167 |
| 4,604,746 A | 8/1986 | Blum ............................ 371/25 |
| 4,965,717 A | 10/1990 | Cutts, Jr. et al. ............ 364/200 |
| 5,142,165 A | 8/1992 | Allard et al. ................ 307/130 |
| 5,193,181 A | 3/1993 | Barlow et al. ............... 395/575 |
| 5,245,615 A | 9/1993 | Treu ........................... 371/16.5 |
| 5,249,187 A | 9/1993 | Bruckert et al. ............ 371/68.1 |
| 5,251,227 A | 10/1993 | Bruckert et al. .............. 371/12 |
| 5,267,246 A | 11/1993 | Huang et al. ................ 371/165 |
| 5,291,600 A | 3/1994 | Lutz et al. ................... 395/700 |
| 5,307,482 A | 4/1994 | Bealkowski et al. ........ 395/575 |

(List continued on next page.)

FOREIGN PATENT DOCUMENTS

| | | | |
|---|---|---|---|
| EP | 811929 A2 | 12/1997 | ........... G06F/13/40 |
| WO | WO9700480 | 1/1997 | ........... G06F/13/00 |

OTHER PUBLICATIONS

"Method to Initialize the Error Handling Logic of a Peripheral Component Interconnect System," *IBM Technical Disclosure Bulletin*, vol. 37, No. 8, Aug. 1994.

IBM Technical Disclosure Bulletin, "Recovery from Single Critical Hardware Resource Unavailability", vol. 36, No. 08, Aug. 1993.

IBM Technical Disclosure Bulletin, "Programmed Clock Synchronization in A Skewed Clock Environment", vol. 26, No. 8, Jan. 1984.

*Primary Examiner*—Peter Wong
*Assistant Examiner*—Raymond N Phan
(74) *Attorney, Agent, or Firm*—Sawyer Law Group LLP

(57) ABSTRACT

Method and system aspects for fault isolation on a bus are provided. In a method aspect, a method for isolating a fault condition on a bus of a computer system, the computer system including an input/output (I/O) subsystem formed by a plurality of I/O devices communicating via the bus, includes categorizing, in a recursive manner, the I/O subsystem, and isolating a source of an error condition within the I/O subsystem. Further, the I/O subsystem communicates via a peripheral component interconnect, PCI, bus. In a system aspect, a computer system for isolating a fault condition on a PCI bus includes a processing mechanism, and an input/output mechanism, coupled to the processing mechanism, comprising a plurality of input/output devices and bridges coupled to a PCI bus and communicating according to a PCI standard. In addition, the system includes a fault isolation mechanism within the processing mechanism for identifying a source of an error condition in the input/output mechanism. Further, the fault isolation mechanism performs categorization of the input/output mechanism in a recursive manner.

27 Claims, 4 Drawing Sheets

U.S. PATENT DOCUMENTS

| | | | |
|---|---|---|---|
| 5,313,625 A | 5/1994 | Hess et al. | 395/575 |
| 5,313,628 A | 5/1994 | Mendelsohn et al. | 395/575 |
| 5,317,752 A | 5/1994 | Jewett et al. | 395/750 |
| 5,375,219 A | 12/1994 | Okabe | 395/425 |
| 5,390,324 A | 2/1995 | Burckhartt et al. | 395/575 |
| 5,410,706 A | 4/1995 | Farrand et al. | 395/700 |
| 5,421,006 A | 5/1995 | Jablon et al. | 395/575 |
| 5,437,047 A | 7/1995 | Nakamura | 395/800 |
| 5,442,777 A | 8/1995 | Nakajima et al. | 395/182.18 |
| 5,444,859 A | 8/1995 | Baker et al. | 395/575 |
| 5,450,579 A * | 9/1995 | Johnson | 395/650 |
| 5,455,933 A | 10/1995 | Schieve et al. | 395/183.03 |
| 5,467,449 A | 11/1995 | Gauronski et al. | 395/185.1 |
| 5,471,674 A | 11/1995 | Stewart et al. | 395/650 |
| 5,475,839 A | 12/1995 | Watson et al. | 395/650 |
| 5,487,148 A | 1/1996 | Komori et al. | 395/182.02 |
| 5,488,688 A | 1/1996 | Gonzales et al. | 395/183.1 |
| 5,499,346 A | 3/1996 | Amini et al. | |
| 5,530,847 A * | 6/1996 | Schieve et al. | 395/183.14 |
| 5,530,946 A | 6/1996 | Bouvier et al. | |
| 5,557,547 A | 9/1996 | Phaal | 364/551.01 |
| 5,560,018 A | 9/1996 | Macon, Jr. et al. | 395/733 |
| 5,560,033 A | 9/1996 | Doherty et al. | 395/800 |
| 5,564,054 A | 10/1996 | Bramnick et al. | 395/700 |
| 5,619,644 A | 4/1997 | Crockett et al. | 395/183.21 |
| 5,680,537 A * | 10/1997 | Byers et al. | 395/182.03 |
| 5,701,409 A * | 12/1997 | Gates et al. | 395/183.17 |
| 5,712,967 A * | 1/1998 | Grossman et al. | 395/182.01 |
| 5,742,851 A * | 4/1998 | Sekine | 395/183.19 |
| 5,768,496 A | 6/1998 | Lidgett et al. | 395/183.01 |
| 5,768,612 A * | 6/1998 | Nelson | 395/800.32 |
| 5,777,549 A | 7/1998 | Arrowsmith et al. | 340/506 |
| 5,784,617 A | 7/1998 | Greenstein et al. | 395/674 |
| 5,790,870 A * | 8/1998 | Hausauner et al. | 395/733 |
| 5,805,785 A | 9/1998 | Dias et al. | 395/182.02 |

* cited by examiner

METHOD AND SYSTEM FOR FAULT ISOLATION FOR PCI BUS ERRORS

CROSS-REFERENCE TO RELATED APPLICATIONS

The present application is related to applications Ser. No. 08/829,017, entitled "Method and System for Check Stop Error Handling," filed Mar. 31, 1997; Ser. No. 08/829,018, entitled "Error Collection Coordination for Software-Readable and Non-Software Readable Fault Isolation Registers in a Computer System," filed Mar. 31, 1997; Ser. No. 08/829,090 entitled "Machine Check Handling for Fault Isolation in a Computer System," filed Mar. 31, 1997; Ser. No. 08/829,089, entitled "Method and System for Reboot Recovery," filed Mar. 31, 1997; and Ser. No. 08/829,090, entitled "A Method and System for Surveillance of Computer System Operations," filed Mar. 31, 1997.

FIELD OF THE INVENTION

The present invention relates generally to input/output operations in a computer system, and more particularly to fault isolation in a peripheral component interconnect (PCI) structure.

BACKGROUND OF THE INVENTION

In many computer systems, support of peripheral devices, such as hard disk drives, speakers, CD-ROM drives, etc., occurs through a standard I/O (input/output) device architecture called Peripheral Component Interconnect (PCI). The PCI architecture supports many complex features, including I/O expansion through PCI-to-PCI bridges, peer-to-peer (device-to-device) data transfers between controlling devices, i.e., masters, and responding devices, i.e., targets, as well as multi-function devices, and both integrated and plug-in devices.

The PCI architecture also defines standards for the detection and capture of error conditions on a PCI bus and in the devices. While the standard facilities provide error capture capabilities, the number of failure scenarios that may occur is large given the wide range of features allowed by the PCI architecture. Thus, isolating faults to a specific failing component becomes very difficult.

For example, for each transaction that occurs on the PCI bus, there is a master device which controls the transaction, and a target device which responds to the master's request. Since data can flow in either direction (i.e., the master can request a read or write), it is important to know which device was the sender of bad data and which device was the receiver. Also, since errors can flow across PCI-to-PCI bridges, it is important to know whether the fault is located on the near or far side of the bridge.

Accordingly, a need exists for a failure isolation technique that would operate successfully for the numerous options supported by the PCI architecture, while providing consistent diagnostic information to servicers across a wide variety of hardware platforms.

SUMMARY OF THE INVENTION

The present invention meets this need and provides method and system aspects for fault isolation on a PCI bus. In a method aspect, a method for isolating a fault condition on a bus of a computer system, the computer system including an input/output (I/O) subsystem formed by a plurality of I/O devices communicating via the bus, includes categorizing, in a recursive manner, the I/O subsystem and isolating a source of an error condition within the I/O subsystem. Further, the I/O subsystem communicates via a peripheral component interconnect, PCI, bus.

In a further method aspect, a method for fault isolation for bus errors includes the steps of (a) processing a device error on a PCI bus, and (b) performing ordered categorization of a plurality of input/output devices coupled to the PCI bus. The method further includes (c) determining whether the device error originates from a subordinate branch of the PCI bus, and (d) recursively performing steps (a)–(c) until the PCI bus is categorized.

In a system aspect, a computer system for isolating a fault condition on a bus includes a processing mechanism, and an input/output mechanism coupled to the processing mechanism. The input/output mechanism comprises a plurality of input/output devices and bridges coupled to a PCI bus and communicating according to a PCI standard. In addition, the system includes a fault isolation mechanism within the processing mechanism for identifying a source of an error condition in the input/output mechanism. Further, the fault isolation mechanism performs categorization of the input/output mechanism in a recursive manner.

With the present invention, a fault isolation technique successfully provides more specific identification of an error source in a PCI bus architecture. The fault isolation technique greatly reduces the ambiguity of error occurrence when the numerous options supported by the PCI architecture are utilized in a given system. Further, by relying on the standard features of the PCI architecture, the fault isolation technique is readily applicable to varying system arrangements to provide versatile application. These and other advantages of the aspects of the present invention will be more fully understood in conjunction with the following detailed description and accompanying drawings.

DESCRIPTION OF THE INVENTION

The present invention relates to fault isolation for a PCI architecture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
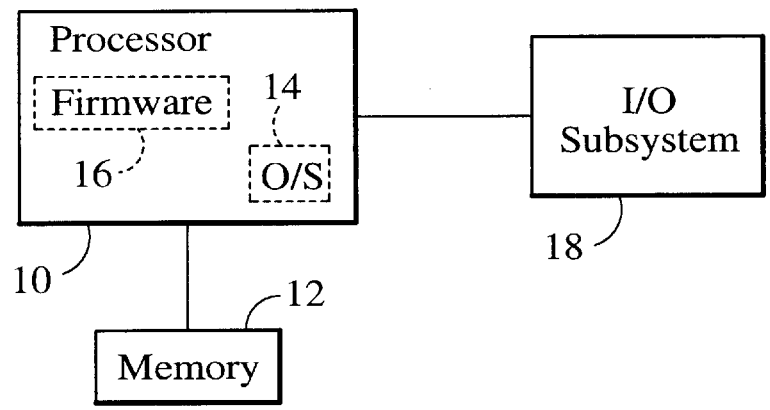
FIG. 1 illustrates a block diagram of a computer system in accordance with the present invention.
Figure 2:
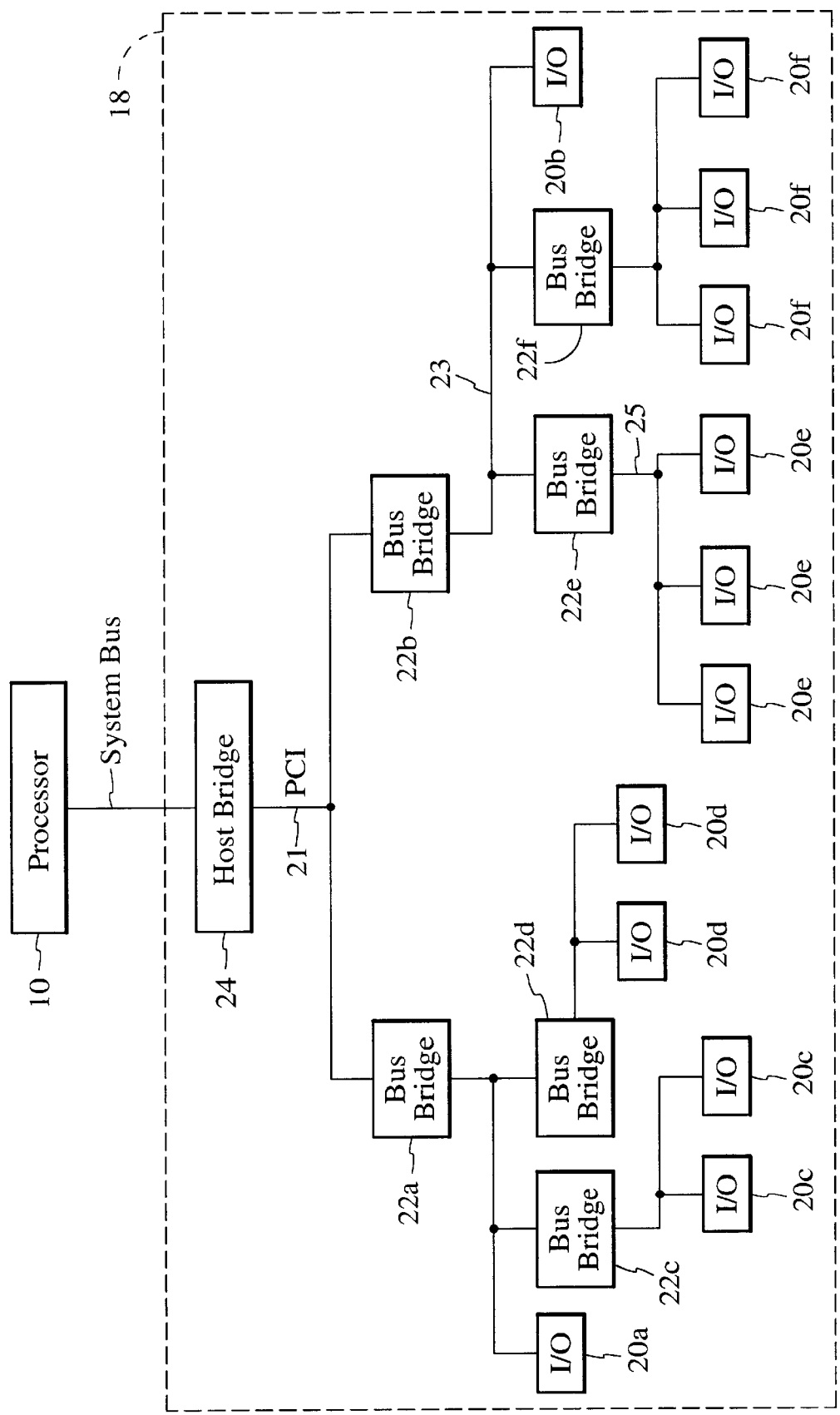
FIG. 2 illustrates a block diagram of an input/output subsystem of the computer system of FIG. 1.

FIG. 1 illustrates a basic block diagram of a general purpose computer system for use with the present invention. As shown, the computer system includes a processor 10, such as a PowerPC processor from IBM Corporation, of Armonk, N.Y. coupled to memory 12, i.e., RAM (random access memory) and ROM (read only memory). An operating system (O/S) 14 typically runs on the processor to perform basic tasks in the computer system and act as a platform for application programs. Also included is firmware 16 that runs on the processor 10 and is code stored in suitable memory, such as Flash memory, non-volatile RAM, or EPROM (erasably programmable read only memory), as is well understood to those skilled in the art. Further, an input/output (I/O) subsystem 18 is coupled to the processor 10 for controlling the interactions between the processor 10 and input/output devices, e.g., a hard disk drive, a monitor, etc., according to a PCI (peripheral component interface) standard, FIG. 2 presents an expanded illustration of the I/O subsystem 18 of the computer system of FIG. 1. Of course, the number and types of components illustrated is meant to be illustrative and not restrictive of an embodiment of the present invention. Utilizing a PCI bus 21 allows a subsystem of I/O devices 20a–20f to interact with the processor 10. In utilizing a plurality of I/O devices 20a–20f, bridges 22a–22f support communication among the plurality of I/O devices 20a–20f with a host bridge 24 acting as a main link to the processor 10. Further, for the hierarchy of the I/O subsystem 18, primary buses and secondary buses exist for bridges linked with other bridges, e.g., primary bus 23 and secondary bus 25 for bridge 22b linked with bridge 22e. With the large number of bridges 22 and I/O devices 20 capable of co-existing in the computer system through the PCI architecture, the types and numbers of failure situations that can occur is high. With the present invention, isolation of a cause for a fault condition provides a significant improvement for diagnostic operations.

Figure 3:
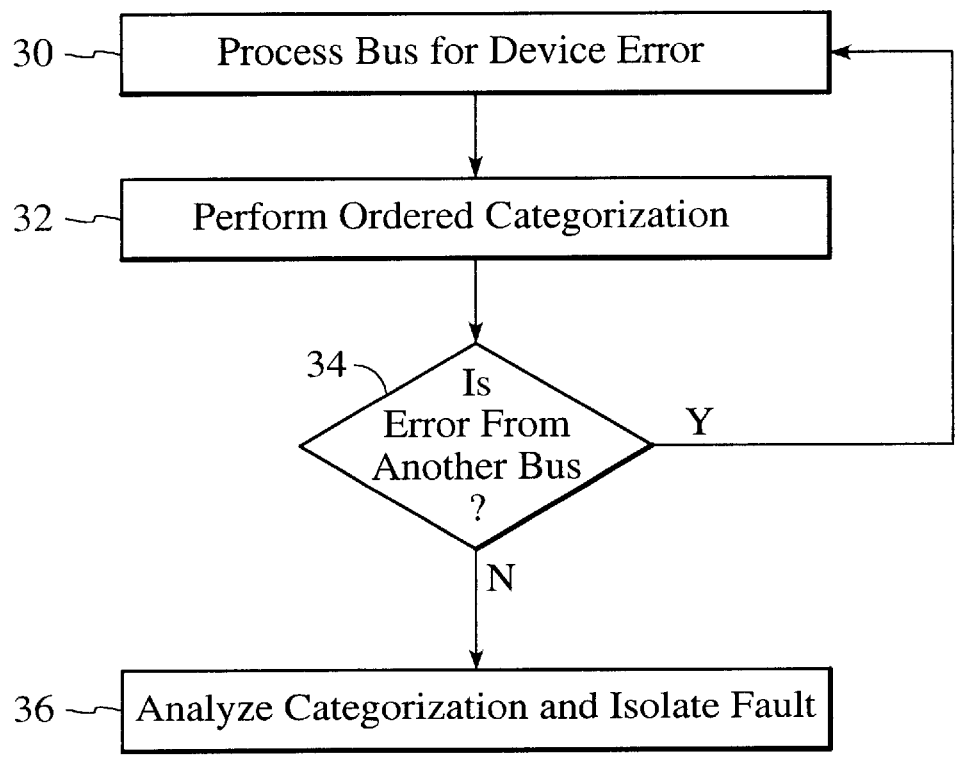
FIG. 3 illustrates a flow diagram of a fault isolation process in accordance with the present invention.

FIG. 3 illustrates a general flow chart for failure isolation in accordance with the present invention. Preferably, the failure isolation is provided as a portion of the firmware 16 (FIG. 1), as is well appreciated by those skilled in the art. The process of isolating a fault condition suitably begins at a top-level PCI bus, i.e., the PCI bus directly under the host bridge 24 (FIG. 2), (step 30). The process continues (step 32) with an ordered categorization of the devices and components within the I/O subsystem. The ordered categorization relies on determining the status of the devices on the bus being examined according to information available in architected status registers provided in the devices in accordance with PCI standards. Details of the ordered categorization are presented with reference to FIG. 4. Generally, the ordered categorization follows a specific order in a process of elimination manner to take into consideration all of the possibilities for errors that exist for data propagation within the hierarchical tree structure of the I/O subsystem 18.

Two major errors on PCI buses include PERR, parity error, which is signalled when a bad data parity condition is seen on the bus, and SERR, system error, which is signalled when an address parity error occurs or when a device has a critical error. Generating parity is non-optional, since it must be performed by all PCI compliant devices. The target device for a particular PCI transaction checks parity and reports an address parity error. With respect to data parity errors, the master device detects and reports data parity errors for a particular read transaction, while the target device detects and reports data parity errors for a particular write transaction. A master device, however, has the ability to detect an error whether the master or target device generated the error. Through the categorization of the present invention, isolation of both of these error conditions preferably occurs.

Figure 4A:
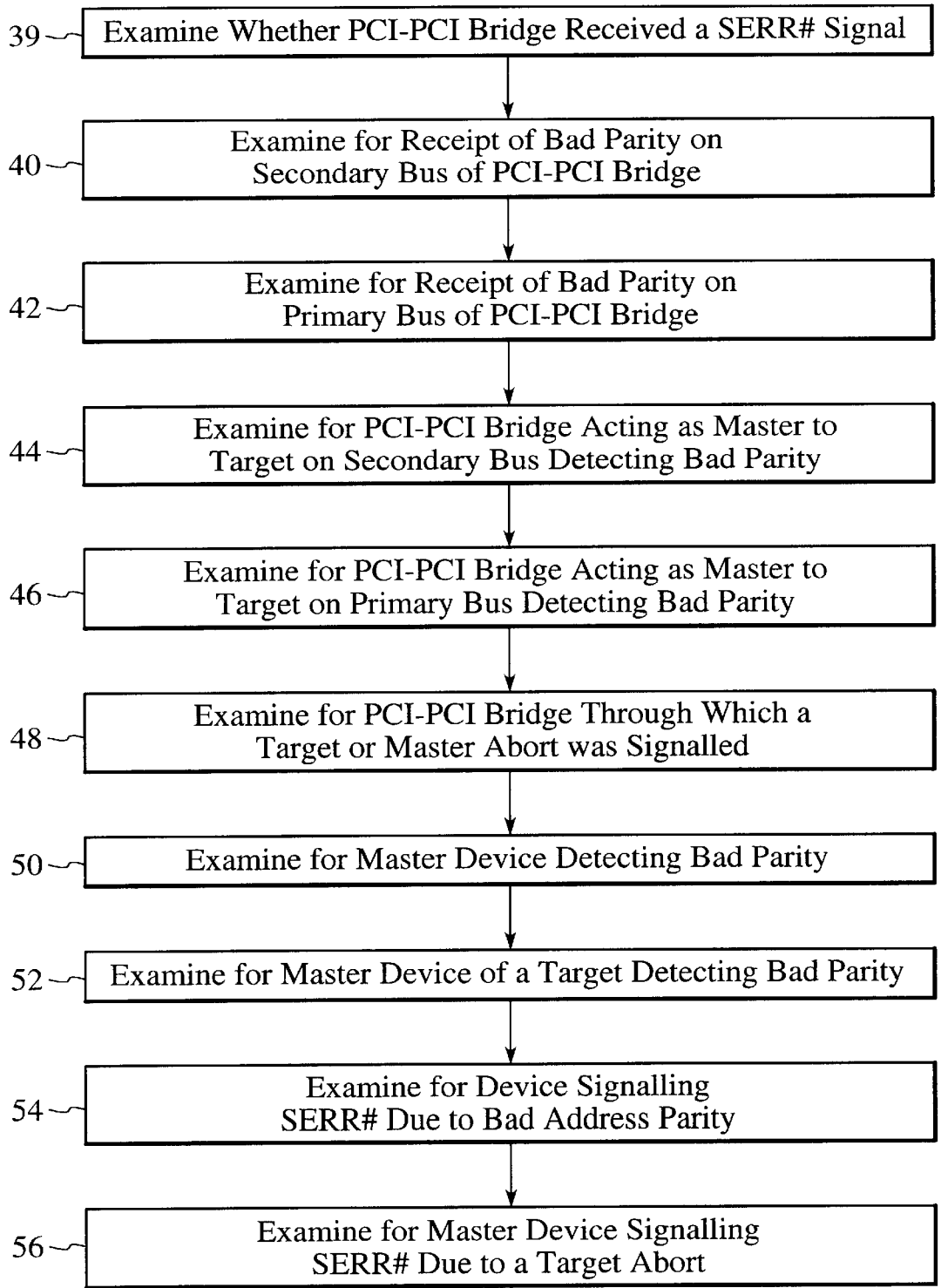
FIG. 4 illustrates a flow diagram of an ordered categorization step of FIG. 3 in greater detail.
Figure 4B:
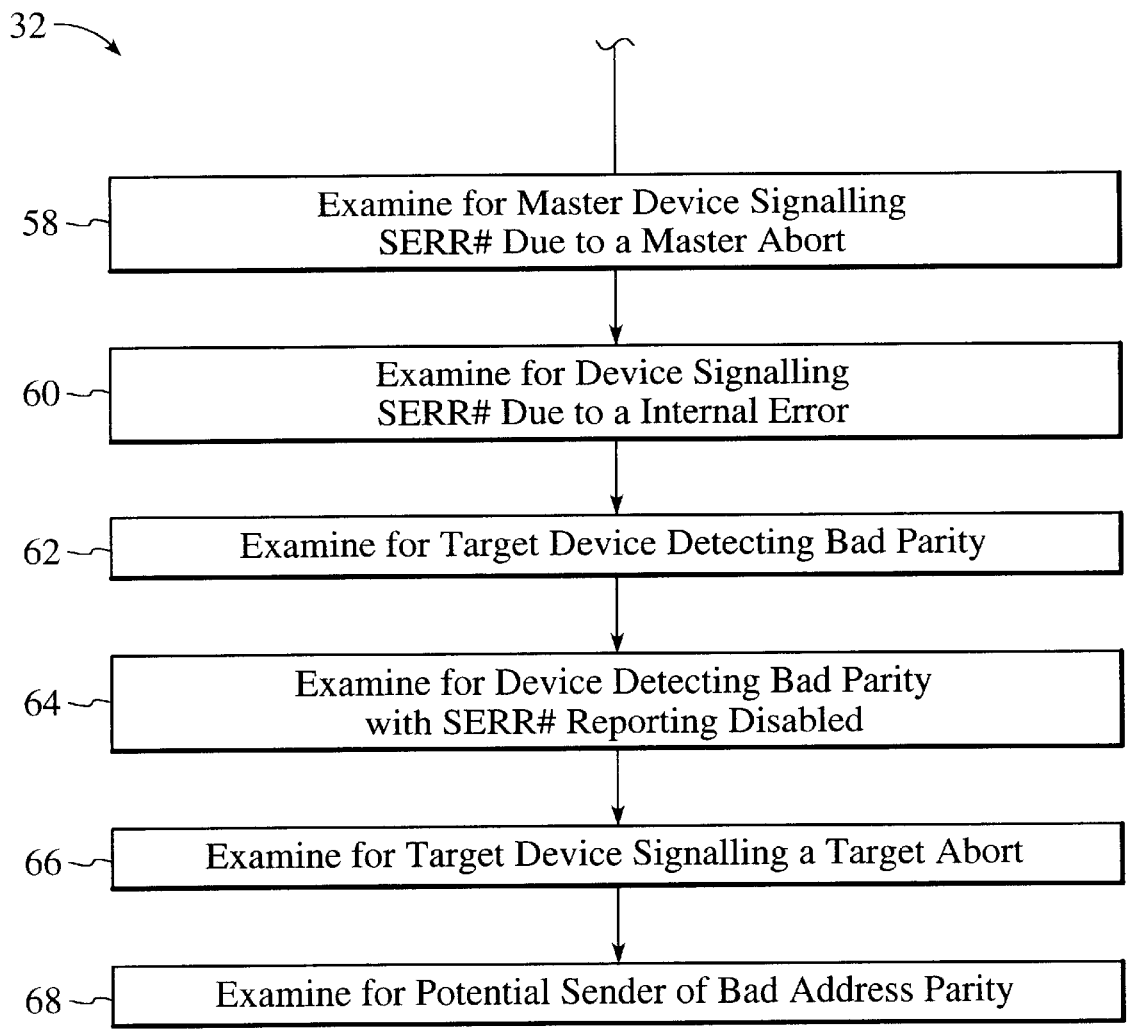

Referring to FIG. 4, an examination for categorization (step 39) is made as to whether a PCI-to-PCI bridge received an SERR# signal on its secondary bus. Next an examination (step 40) for categorization occurs for a PCI-to-PCI bridge which received bad parity on its secondary bus. When that condition exists, a next examination (step 42) occurs for a PCI-to-PCI bridge which received bad parity on its primary bus. The examination (step 44) continues with consideration for a PCI-to-PCI bridge acting as a master device to a target on the secondary bus which detected bad parity. A next examination (step 46) occurs for a PCI-to-PCI bridge acting as a master device to a target on the primary bus which detected bad parity. Categorization continues with an examination for a PCI-to-PCI bridge through which a target or master Abort was signalled (step 48).

Following examination of PCI-to-PCI bridges, categorization continues with identification of a master device that detected bad parity (step 50). Further categorization occurs with identification of a master device of a target that detected bad parity (step 52). A next categorization examination occurs for a device that signalled SERR# due to bad address parity (step 54). Subsequently, examination occurs for a master device that signalled SERR# due to a target Abort (step 56), and a master device that signalled SERR# due to a m aster Abort (step 58). Categorization continues by examining for a device that signalled SERR# due to an internal error (step 60), a target device that detected bad parity (step 62), and a device that detected bad parity, but had SERR# reporting disabled (step 64). Additionally, categorization occurs with examination for a target device that signalled a target Abort (step 66), and for a potential sender of bad address parity, if other devices on the bus are signalling detection of bad address parity (step 68).

As the categorization of a bus is occurring, the path of the error condition is followed. Referring back to FIG. 3, when the categorization (step 32) indicates that a PCI-to-PCI bridge connects to another PCI-to-PCI bridge from which the error condition is occurring (step 34), the sequence returns to perform the categorization on the bus supported by the other PCI-to-PCI bridge. Thus, the categorization is performed recursively from the top-level PCI bus down through all of the sub-bridges, i.e., subordinate branches of the PCI bus through the hierarchy of the I/O subsystem 18 (FIG. 2). Once the ordered categorization is completed, the resulting information is preferably returned as an error log and analyzed for an error/fault source isolation (step 36) within the I/O subsystem 18. With the similarity among error register values for many of the error conditions, the ordered categorization of the present invention properly identifies the type of error each device may have detected to assist in the analysis of the fault source.

By way of example, address parity errors that result in an SERR# signal are isolated by finding a single device on a bus which did not detect bad address parity, since the only such device would be the one that issued the bad address on the bus. Data parity errors are isolated by finding the master and target devices, then determining which of the two actually detected the bad data. The device detecting the bad data is termed the "signalling" device, while the source of the bad data is termed the "sending" device. The "sending" device is the top priority for replacement. If the master and target are on two different buses (with one or more PCI-to-PCI bridges on the path between them), the failure is isolated to a specific bus. As a result, PCI-to-PCI bridges may be listed as the "sending" or "signalling" device, or both.

Further, for multi-function devices, examination suitably occurs as though there are distinct devices isolated to a same physical location. Further, internal device errors reported by an SERR# (system error, active low) signal are isolated to the signalling device. Additionally, aborted operations that result in an SERR# signal are suitably isolated to the master and target device, with the top priority for replacement being the device that caused the abort.

Although the present invention has been described in accordance with the embodiments shown, one of ordinary skill in the art will readily recognize that there could be variations to the embodiments and those variations would be within the spirit and scope of the present invention. By way of example, although the present invention is described in terms of a PCI bus, the fault isolation techniques are suitable for application with other bus structures, as well. Accordingly, many modifications may be made by one of ordinary skill in the art without departing from the spirit and scope of the appended claims.

What is claimed is:

1. A method for isolating a fault condition on a bus of a computer system, the computer system including an input/output (I/O) subsystem formed by a plurality of I/O devices communicating via the bus, the method comprising the steps of:

(a) categorizing, in a recursive manner, the I/O subsystem;
   (b) forming an error log based on the categorizing; and
   (c) isolating a source of an error condition within the I/O subsystem.

2. The method of claim 1 wherein the I/O subsystem communicates via a peripheral component interconnect, PCI, bus.

3. The method of claim 2 wherein the I/O subsystem further comprises a PCI-to-PCI bridge, the PCI-to-PCI bridge having a primary bus and a secondary bus.

4. The method of claim 1 wherein categorizing step (a) further comprises examining whether a PCI-to-PCI bridge received a SERR# signal on the secondary bus.

5. The method for isolating of claim 4 wherein the categorizing step (a) further comprises examining for bad parity received on the secondary bus of the PCI-to- PCI bridge.

6. The method for isolating of claim 5 wherein the categorizing step (a) further comprises examining for bad parity received on the primary bus of the PCI-to-PCI bridge.

7. The method for isolating of claim 6 wherein the categorizing step (a) further comprises examining for the PCI-to-PCI bridge acting as a master device to a target device on the secondary bus which detected bad parity.

8. The method for isolating of claim 7 wherein the categorizing step (a) further comprises examining for the PCI-to-PCI bridge acting as the master device to the target device on the primary bus which detected bad parity.

9. The method for isolating of claim 8 wherein the categorizing step (a) further comprises examining for the PCI-to-PCI bridge signalling an abort.

10. The method for isolating of claim 9 wherein the categorizing step (a) further comprises examining for the master device detecting bad parity.

11. The method for isolating of claim 10 wherein the categorizing step (a) further comprises examining for the master device of the target device detecting bad parity.

12. The method for isolating of claim 11 wherein the categorizing step (a) further comprises examining for a device signalling a system error due to bad address parity.

13. The method for isolating of claim 12 wherein the categorizing step (a) further comprises examining for the master device signalling the system error due to an abort on the target device.

14. The method for isolating of claim 13 wherein the categorizing step (a) further comprises examining for the master device signalling the system error due to a master abort.

15. The method for isolating of claim 14 wherein the categorizing step (a) further comprises examining for the device signalling the system error due to an internal error.

16. The method for isolating of claim 15 wherein the categorizing step (a) further comprises examining for the target device detecting bad parity.

17. The method for isolating of claim 16 wherein the categorizing step (a) further comprises examining for a device detecting bad parity while system error reporting is disabled.

18. The method for isolating of claim 17 wherein the categorizing step (a) further comprises examining for the target device signalling a target abort.

19. The method for isolating of claim 18 wherein the categorizing step (a) further comprises examining for a potential sender of bad address parity.

20. A computer system for isolating a fault condition on a peripheral component interconnect, PCI, bus, the system comprising:

a processing means;
   an input/output means coupled to the processing means and comprising a plurality of input/output devices and bridges coupled to a PCI bus and communicating according to a PCI standard; and
   fault isolation means within the processing means for identifying a source of an error condition in the input/output means, for performing categorization of the input/output means in a recursive manner, and for providing an error log for isolation of the source of the error condition within the input/output means.

21. The system of claim 20 wherein the fault isolation means performs categorization by examining error condition values.

22. The system of claim 21 wherein the error condition values are stored in status registers of the input/output means.

23. A method for fault isolation for peripheral component interconnect (PCI) bus errors, the method comprising the steps of:

(a) processing a device error on a PCI bus;
   (b) performing ordered categorization of a plurality of input/output devices coupled to the PCI bus;
   (c) determining whether the device error originates from a subordinate branch of the PCI bus; and
   (d) recursively performing steps (a)–(c) until the PCI bus is categorized and
   (e) forming an error log from the ordered categorization.

24. The method of claim 23 further comprising analyzing the error log to isolate the device error.

25. The method of claim 23 wherein the ordered categorizing examines status registers of the plurality of input/output devices.

26. The method of claim 25 wherein the plurality of input/output devices comprise one or more PCI-to-PCI bridge device.

27. The method of claim 26 wherein the one or more PCI-to-PCI bridge devices support one or more subordinate branches of the PCI bus.

* * * * *

UNITED STATES PATENT AND TRADEMARK OFFICE
CERTIFICATE OF CORRECTION

PATENT NO.    : 6,557,121 B1
DATED         : April 29, 2003
INVENTOR(S)   : McLaughlin et al.

It is certified that error appears in the above-identified patent and that said Letters Patent is hereby corrected as shown below:

<u>Title page,</u>
Item [54], Title, should read as follows:
-- METHOD AND SYSTEM FOR FAULT ISOLATION FOR PCI BUS ERRORS UTILIZING RECURSIVE CATEGORIZATION --

<u>Column 1,</u>
Paragraph 1, under CROSS-REFERENCE TO RELATED APPLICATIONS: should read -- The present application is related to applications Ser. No. 08/829,017, entitled Method and System for Check Stop Error Handling," filed March 31, 1997;, Ser. No. 08/829,018, entitled "Error Collection Coordination for Software-Readable and Non-Software Readable Fault Isolation Registers in a Computer System," filed March 31, 1997; Ser. No. 08/829,016, entitled "Machine Check Handling for Fault Isolation in a Computer System" filed March 31,1997; Ser. No. 08/829,089, entitled "Method and System for Reboot Recovery," filed March 31, 1997; and Ser. No. 08/829,090, entitled "A Method and System for Surveillance for Computer System Operations," filed March 31, 1997. --

<u>Column 6,</u>
Line 41, under "What is claimed is:" should read:
    23. A method for fault isolation for peripheral component interconnect (PCI) bus errors, the method comprising the steps of:
        (a) processing a device error on a PCI bus;
        (b) performing ordered categorization of a plurality of input/output devices coupled to the PCI bus;
        (c) determining whether the device error originates from a subordinate branch of the PCI bus;
        (d) recursively performing steps (a)-(c) until the PCI bus is categorized and
        (e) forming an error log from the ordered categorization.

UNITED STATES PATENT AND TRADEMARK OFFICE
CERTIFICATE OF CORRECTION

PATENT NO. : 6,557,121 B1
DATED : April 29, 2003
INVENTOR(S) : McLaughlin et al.

It is certified that error appears in the above-identified patent and that said Letters Patent is hereby corrected as shown below:

Column 6 cont'd,
Line 58, under "What is claimed is:" should read:
    26. The method is claim 25 wherein the plurality of input/output devices comprises one or more PCI-to-PCI bridge devices.

Signed and Sealed this

Seventh Day of October, 2003

JAMES E. ROGAN
*Director of the United States Patent and Trademark Office*